United States Patent
Heinen et al.

(10) Patent No.: US 6,630,526 B2
(45) Date of Patent: Oct. 7, 2003

(54) FLAME-RETARDANT MIXTURE

(75) Inventors: Wouter Heinen, Maastricht (NL);
Maurits F. H. Van Tol, Limbricht (NL); Renier H. M. Kierkels, Beegden (NL); Gerhard Van Vliet, Maastricht (NL)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/102,424

(22) Filed: Mar. 21, 2002

(65) Prior Publication Data
US 2003/0018107 A1 Jan. 23, 2003

Related U.S. Application Data

(63) Continuation of application No. PCT/NL00/00610, filed on Sep. 1, 2000.

(30) Foreign Application Priority Data

Sep. 21, 1999 (NL) .............................. 1013105

(51) Int. Cl.$^7$ ................. C08K 5/3492; C08K 5/49; C08K 3/32
(52) U.S. Cl. ................. 524/100; 524/115; 524/414
(58) Field of Search ................. 524/100, 115, 524/414

(56) References Cited

U.S. PATENT DOCUMENTS 6,136,973 A  * 10/2000  Suzuki et al. ............... 544/195

FOREIGN PATENT DOCUMENTS

| JP | 59045352 | 3/1984 |
| JP | 09324105 | 12/1997 |
| WO | 9616948 | 6/1996 |
| WO | 9735016 | 8/1997 |
| WO | 9902606 | 1/1999 |

* cited by examiner

Primary Examiner—Kriellion A. Sanders
(74) Attorney, Agent, or Firm—David R. Crichton

(57) ABSTRACT

Flame-retardant mixture comprising:
  a) a polymer composition
  b) a phosphorus-containing compound
  c) a triazine flame retardant, the weight ratio of a, b and c lying between 94:1:5 and 35:30:35, the triazine flame retardant comprising at least:
    c1) 1–95 wt. % melem,
    c2) 0.01–25 wt. % melam,
    c3) 0.01–20 wt. % melamine,
    c4) 0.1–95 wt. % higher condensation products of melamine and/or of melem, the wt. % being relative to the total of c1) up to and including c4) and together amounting to 100%, and the concentration of volatile components in the flame retardant being at most 5 wt. %. Also a process for the preparation of the triazine flame retardant.

12 Claims, No Drawings

FLAME-RETARDANT MIXTURE

CROSS REFERENCE TO RELATED APPLICATION

This application is a Continuation of International Application No. PCT/NL00/00610 filed Sep. 1, 2000 which designated the U.S. and was published in the English language. The contents of this PCT application are incorporated in their entirety by reference.

The invention relates to a flame-retardant mixture comprising:
a) a polymer composition
b) a phosphorus-containing compound
c) a triazine flame retardant, the weight ratio of a, b en c lying between 94:1:5 and 35:30:35.

Such a mixture is known from WO 99/02606, in which the melamine condensation products melam or melem are used as the flame retardant in polyamide or polyester compositions.

The disadvantage of using melam or melem as the flame retardant is that its flame-retardant effect is insufficient for a number of applications.

The aim of the invention, now, is to provide a flame-retardant mixture whose flame-retardant properties are better than those of a mixture containing melam or melem as the flame retardant.

This aim is achieved by providing a flame-retardant mixture wherein the triazine flame retardant comprises at least:
c1) 1–95 wt. % melem,
c2) 0.01–25 wt. % melam,
c3) 0.01–20 wt. % melamine,
c4) 0.1–95 wt. % higher condensation products of melamine and/or melem, the wt. % being understood to be relative to the total of c1) up to and including c4) and together amounting to 100%, and the concentration of volatile components in the flame retardant being at most 5 wt. %. The mixture according to the invention shows a substantially shorter burning time in the UL 94 vertical burning test than the known mixture.

The flame-retardant mixture according to the invention comprises:
a) a polymer composition
b) a phosphorus-containing compound
c) a triazine flame retardant, the weight ratio of a, b and c lying between 94:1:5 and 35:30:35, and the triazine flame retardant comprising at least:
c1) 1–95 wt. % melem,
c2) 0.01–25 wt. % melam,
c3) 0.01–20 wt. % melamine,
c4) 0.1–95 wt. % higher condensation products of melamine and/or melem, the wt. % being understood to be relative to the total of c1) up to and including c4) and together amounting to 100%, and the concentration of volatile components in the flame retardant being at most 5 wt. %.

The polymer composition contains at least a polymer, and may in addition to polymer also comprise reinforcing agents and/or fillers and/or compounds with a synergistic effect with respect to the flame-retardant composition and/or other flame-retardant components than those according to the invention and also the usual additives, for example thermal and UV stabilisers, mould release agents, flow-promoting agents, softeners, lubricants, dispersing agents, colourants and/or pigments, in amounts commonly used for these additives, providing the properties are not adversely affected.

Polymers that are suitable for use in the flame-retardant mixture according to the invention are polymers that require heat-resistant flame retardants such as polyamides, polyimides, polyesters, polycarbonates, polymers containing styrene, epoxy resins, unsaturated polyester resins, polyurethanes and mixtures and blends of these materials. Examples of polyamides are polyamides and copolyamides that are derived from diamines and dicarboxylic acids and/or from aminocarboxylic acids or the corresponding lactams, such as polyamide 4, polyamide 6, polyamide 6/6, 6/10, 6/9, 6/12, 4/6, 66/6, 6/66, polyamide 11, polyamide 12, partially aromatic (co)polyamides, for example polyamides based on an aromatic diamine and adipic acid; polyamides prepared from an alkylenediamine and iso- and/or terephthalic acid and copolyamides thereof, copolyether amides, copolyester amide, etc. Examples of polyesters are polyesters derived from dicarboxylic acids and dialcohols and/or from hydroxycarboxylic acids or the corresponding lactones such as polyethylene terephthalate, polybutylene terephthalate, poly-1,4-dimethylolcyclohexane terephthalate, polyhydroxybenzoates, polycaprolactone and copolyesters thereof, copolyether esters, etc. Examples of polymers containing styrene are polystyrene, acrylonitrile-styrene copolymer, acrylonitrile-styrene-butadiene copolymers and mixtures hereof.

As the polymer, the flame-retardant mixture preferably contains polyesters such as polyethylene terephthalate and/or polybutylene terephthalate, polybutylene terephthalate being especially preferable, or polyamides, with polyamide 6, polyamide 6,6, polyamide 4,6 or mixtures of the aforementioned polyamides being especially preferable.

If reinforcing agents and/or fillers are used in the polymer composition, their concentration may vary within a wide range and this concentration is partly determined by the level of mechanical properties desired. In general the concentration of reinforcing agents will not amount to more than 50 wt. % of the total of the flame-retardant mixture according to the invention. Preferably a reinforced flame-retardant mixture will contain 5–50 wt. % reinforcing agents, more preferably 15–45 wt. %. Examples of reinforcing agents are mica, clay, talc, glass fibres, aramide fibres and carbon fibres. Different reinforcing agents may be combined. Glass fibres are however preferable.

The flame-retardant properties of the flame-retardant mixture according to the invention may be enhanced by the presence of a compound with a synergistic effect with respect to the flame-retardant composition, such as a charforming compound, optionally combined with a catalyst promoting the formation of char in the polymer composition. In general the concentration of the triazine flame retardant may consequently be lower.

In principle, all the known substances that are capable of enhancing the flame-retardant properties of flame-retardant polymer compositions by means of char formation caused by the fire are suitable for use as the charforming compound. Examples of this are phenolic resins, epoxy resins, polyurethanes, novolak resins, melamine resins, alkyd resins, allyl resins, unsaturated polyester resins, silicone resins, urethane resins, acrylate resins, polyphenylene ether, polycarbonate, polyvinyl alcohol, poly(ethylene covinyl), starch, glucose and compounds containing at least two hydroxyl groups. Examples of compounds containing at least two hydroxyl groups are alcohols containing at least two hydroxyl groups, for example pentaerythritol, dipentaerythritol, tripentaerythritol and mixtures hereof. The concentration in the total of the flame-retardant mixture of the charforming compound that is synergistic with respect to the triazine flame retardant generally lies between 0 and 30 wt. %, preferably between 1 and 20 wt. %.

Metal salts of tungstic acid, a complex oxide acid of tungsten and a metalloid, salts of tin oxide, ammonium sulphamate and/or its dimer may for example be used as the catalyst promoting char formation. Metal salts of tungstic acid are preferably alkali metal salts of tungstic acid and in particular sodium tungstate. A complex oxide acid of tungsten and a metalloid is understood to be a complex acid oxide that is formed by a metalloid such as silicon or phosphorus and tungsten such as silicotungstic acid or phosphotungstic acid. The amount of catalyst promoting char formation that is used in the total of the flame-retardant mixture is 0.1–5 wt. %, preferably 0.1–2.5 wt. %.

The flame-retardant properties of the flame-retardant mixture according to the invention may be further enhanced if the polymer composition comprises one or more other flame-retardant components. In principle, all the know flame retardants are suitable for use as the other flame-retardant component. Examples are antimony oxides, such as antimony trioxide, in combination with halogen compounds; alkaline earth metal oxides, for example zinc oxide, magnesium oxide; other metal oxides, for example alumina, silica, iron oxide and manganese oxide; metal hydroxides, for example magnesium hydroxide and aluminium hydroxide; nanocomposites; clay such as montmorillonite clay and kaolin clay; treated clay such as clay treated with primary ammonium compounds or with quarternary ammonium compounds or with melamine or with melamine condensation products or with phosphorus-containing compounds; silicon-containing compounds such as silicates, organosilicon compounds, aromatic organosilicon compounds and silanes; metal borates, for example zinc borate, whether or not hydrated; sulphur-containing compounds. Examples of sulphur-containing compounds are zinc sulphide, ammonium sulphate, ammonium sulphamate and melamine sulphate.

The concentration of other flame-retardant components used in the polymer composition may vary within a wide range, but will generally not be more than the sum of the concentration of phosphorus-containing compound and triazine flame retardant. Preferably the total of the flame-retardant mixture contains between 0 and 35 wt. % other flame-retardant components, more in particular 1–30 wt. %.

Many of the compounds mentioned here may also promote the formation of char. Other known compounds present in flame-retardant compositions such as polytetrafluoroethylene may also be present.

The concentration of the polymer composition in the total of the flame-retardant mixture varies between 35 wt. % and 95 wt. %.

The phosphorus-containing compound in the flame-retardant mixture according to the invention may be chosen from the classes of phosphates, phosphonates, phosphinates, phosphines, phosphine sulphides, phosphine oxides and phosphites.

Phosphates that may be used in the present invention are phosphate salts such as the phosphates, pyrophosphates and polyphosphates of nitrogen-containing compounds such as ammonia, urea, guanidine, melamine, melam, melem, and phosphate esters such as aromatic orthophosphate esters such as tris(p-cresyl) phosphate, resorcinol diphosphate and tetraphenylbisphenol-A diphosphate and aliphatic phosphate esters such as NH-1197® and NH-1511® from Great Lakes and Fyrol-51® from Akzo-Nobel.

Examples of suitable phosphonates are aminomethylenephosphonates such as diethyleneaminopenta (methylphosphonic acid) or hexamethylenediaminetetra (methylenephosphonic acid) and their salts, such as the aluminium, calcium and zinc salts. Other examples of suitable phosphonates are phosphonate esters such as XPM1000® from Solutia and the esters of trimethylolpropane and methylphosphonic acid such as 5-ethyl-2-methyl-1,3,2-dioxaphosphorinan-5-yl-P-oxide)methyl methyl ester of methylphosphonic acid, bis[(5-ethyl-2-methyl-1,3,2-dioxaphosphorinan-5-yl-P,P'-dioxide)methyl] ester of methylphosphonic acid, Antiblaze® 1045LV from Albright&Wilson and Hostaflam® OP910 from Clariant and polymeric pentaerythritylphosphonates such as poly[3(-9) alkylene-2,4,8,10-tetraoxa-3,9-diphosphaspiro[5.5] undecane-3,9-dioxide].

Examples of suitable phosphinates are phosphinate esters and alicyclic phosphinic acids such as 1-hydroxyphospholan-1-oxide, alkyl-, aryl- and alkylarylphosphinates and their salts, for example the calcium, aluminium or zinc salts.

Examples of suitable phosphine oxides are triphenylphosphine oxide, isobutylbis(hydroxypropyl)phosphine oxide, isobutylbis(hydroxymethyl)phosphine oxide and 1,4-diisobutyl-1,4-diphosphoryl-2,3,5,6-tetrahydroxycyclohexane (Cyagard® RF-1204 from Cytec Industries).

Preferably use is made of phosphorus-containing compounds having a high phosphorus content, preferably above 10 wt. %, that have sufficient thermal stability, so that they will not evaporate or degrade to any significant extent during the processing of the flame-retardant mixture into semi-finished products or end products by means of known techniques such as injection-moulding or extrusion. Most preferably use is therefore made of: Antiblaze® 1045, XPM-1000®, NH-1197®, NH-1511® or phosphinates such as dialkylphosphinic acids, alicyclic phosphinic acids or the salts of these acids, preferably the calcium, aluminium or zinc salts.

The concentration of the phosphorus-containing compound in the total of the flame-retardant mixture varies between 1 wt. % and 30 wt. %, preferably between 4 wt. % and 25 wt. %

The triazine flame retardant in the flame-retardant mixture according to the invention comprises at least:

c1) 1–95 wt. % melem, c2) 0.01–25 wt. % melam, c3) 0.01–20 wt. % melamine, c4) 0.1–95 wt. % higher condensation products of melamine and/or melem, the wt. % being understood to be relative to the total of c1) up to and including c4) and together amounting to 100% and the concentration of volatile components in the flame retardant being at most 5 wt. %.

Higher condensation products of melamine and/or melem comprise products that are formed in the condensation of two or more melem and/or melamine molecules into molecules having a molecular weight that is greater than that of melam, with release of ammonia. Examples of higher condensation products of melamine and/or melem are melon, methone and polymelamine.

The concentration of volatile components is here defined as the decrease in weight that occurs when the triazine flame retardant is heated from room temperature to 300° C. in a TGA measurement (TGA=ThermoGravimetric Analysis) using a heating rate of 200° C. per minute. If the triazine flame retardant contains too high an amount of volatile components such as urea and/or water and/or melamine, this may adversely affect the processing properties of a flame-retardant mixture according to the invention whose polymer composition comprises a polymer with a high melting point such as polyethylene terephthalate (PET), polybutylene terephthalate (PBT) or polyamide. Examples of such adverse effects are foaming during extrusion or the formation of deposits in the mould in injection-moulding.

The triazine flame retardant in the flame-retardant mixture according to the invention preferably comprises at least:

c1) 10–95 wt. % melem, c2) 0.05–10 wt. % melam, c3) 0.1–20 wt. % melamine, c4) 1–90 wt. % higher condensation products of melamine and/or melem, the wt. % being understood to be relative to the total of c1) up to and including c4) and together amounting to 100% and the concentration of volatile components in the flame retardant being at most 5 wt. %.

The concentration of triazine flame retardant in the total of the flame-retardant mixture varies between 5 wt. % and 35 wt. %.

The triazine flame retardant may be obtained by combining the individual components in a desired ratio. However, the triazine flame retardant is preferably obtained in a process in which melamine-containing starting material is heated, for example by passing it through a heating zone for more than 0.1 sec., preferably between 1 sec. and 400 minutes, in particular between 2 sec. and 300 minutes, at a temperature of 350–800° C., preferably between 375 and 600° C., and at a pressure lying between 1 kPa and 50 MPa, preferably between atmospheric pressure and 30 MPa, more in particular between atmospheric pressure and 15 MPa. The advantage of this is that the triazine flame retardant may be prepared at a lower cost price in comparison with the combining of components that have first been separately synthesized.

Examples of heating zones are heating zones such as those that are to be found in extruders such as single- and double-screw extruders, ovens, drum ovens, rotary kilns, autoclaves, turbo mixers, plough-share mixers, VOMM® reactors, tumble mixers, turbulence mixers such as those manufactured by Drais®, ribbon blenders, mixtruders, continuous and discontinuous kneaders, rotating drum ovens, horizontal reactors with a conveyor screw, etc.

The mixture of melamine, melem, melam and higher condensation products of melamine and/or melem may optionally be treated further. Such further treatment is preferably washing with water, which will cause a portion of the melamine and/or other water-soluble components to dissolve and be removed from the triazine flame retardant.

Aminotriazine-containing starting material may be used as the starting material for the present process. Examples of aminotriazine-containing starting material are melamine-containing starting material and melam-containing starting material. An example of melamine-containing starting material is virtually pure melamine, for example obtained from a continuously operating gas-phase melamine plant in which the melamine is purified by means of crystallisation. A process for the preparation of melamine via a gas-phase process is for example known from U.S. Pat. No. 3,210,352. This high degree of purity is however not necessary. Melam or mixtures of melamine and melam and/or melem and/or higher condensation products of melamine and/or of melem may optionally be used as a starting material, for example the product that is formed when a melamine plant is started up or melamine of the kind prepared in a gas-phase melamine plant before the purification by means of crystallisation has taken place or melamine which is contaminated with melam and/or melem and/or higher condensation products of melamine and/or of melem and has been formed in a different way. It is also possible to use melamine obtained in a liquid-phase process as the starting material. A known process for the preparation of melamine via a liquid-phase process is described in U.S. Pat. No. 4,565,867, of which it is known that the purity is less than of the product of a gas-phase process, its melam concentration in particular being higher. The aminotriazine-containing starting material may without objection contain catalyst residues, ureidomelamine and/or guanidine carbonate. Oxygen-containing triazine compounds such as ammeline, ammelide and/or cyanuric acid may be present without objection. Remains of starting materials that are used for the preparation of aminotriazines, such as urea and/or dicyanodiamide, may also be present. The aminotriazine starting material for the present process may also contain mixtures of urea, oxygen-containing triazine compounds, dicyanodiamide, guanidine carbonate, ureidomelamine and catalyst residues. The starting material may moreover contain catalysts promoting condensation, such as ammoniumdihydrogen phosphate or ammonium nitrate.

In a preferred embodiment of the process for the preparation of the triazine flame retardant the melamine-containing starting material is heated in an autoclave or in an extruder. Preferably at a pressure between atmospheric pressure and 20 MPa, at a temperature of 350–625° C. and a residence time of between 0.1 sec. and 360 minutes. More in particular the melamine-containing starting material is heated in an extruder at a residence time in the extruder of between 0.1 sec. and 60 minutes. When the process according to the invention is carried out at a pressure that is lower than the vapour pressure of the components present at the operating temperature, volatile components, such as melamine and urea, may evaporate or sublimate. The evaporated or sublimated volatile components may be collected and re-used. A desublimation set-up may be used for the collecting, for example a set-up in which the gas stream containing the volatile components in the form of a gas or dust is passed along cooled ribs or a set-up in which the gas stream containing the volatile components in the form of a gas or dust is mixed with cool air and in which the volatile components are condensed or deposited in the form of rime and separated from non-condensing or non-rime-forming components such as air. When use is made of a heating zone present in a continuously operating set-up, the material obtained from the desublimation set-up may be directly and continuously fed to the heating zone.

The flame-retardant mixture according to the invention may be prepared using conventional techniques known per se, by for example dry-mixing all or some of the components in a tumble mixer, followed by melting in a melt mixer, for example a Brabender mixer or a single- or double-screw extruder or a kneader. Preferably a double-screw extruder is used.

The various components of the flame-retardant mixture according to the invention may be dosed to the extruder's throat together. They may also be dosed to the extruder in different places. Some of the components optionally present, such as pigments, stabilisers, the flame-retardant composition, compounds with a synergistic effect with respect to the triazine flame retardant and/or other flame-retardant components, may be added to the polymer for example in the form of a masterbatch.

The flame-retardant mixture according to the invention may be processed into semi-finished products or end products using techniques known to a person skilled in the art, for example injection-moulding.

The invention will be further elucidated with reference to the following examples:

EXAMPLES 1 UP TO AND INCLUDING 19
AND COMPARATIVE EXPERIMENTS A, B, C
AND D

Assessment of Flame-retardant Mixtures

Flame-retardant mixtures were prepared in an extruder. The compositions of the mixtures are given in Table 1a, as is the composition of the triazine flame retardant that was used in the flame-retardant mixtures. The extruder's cylinder temperature was each time set to 250° C.; the speed of the screw in the extruder was each time set to 200 rpm. The type of extruder that was used is indicated in Table 1a.

Test bars according to ISO 527/1 and UL 94 were produced from the flame-retardant mixtures. The modulus of elasticity and elongation at break were determined according to ISO 527/1.

The test bars were subjected to the UL 94 vertical burning test to determine their flame-retardant properties. The UL 94 test bars were 1.6 mm thick unless otherwise specified in Table 1b. The results of the measurements are given in Table 1b.

EXAMPLES 20 UP TO AND INCLUDING 34 AND COMPARATIVE EXPERIMENT F

Preparation of a Triazine Flame Retardant

A triazine-containing starting material was dosed to a reactor. The composition of the starting material, the type of reactor, the reactor temperature, the residence time in the reactor and the degree of loading and the process pressure are indicated in Table 2a. The composition of the mixture leaving the reactor was determined. The compositions of the triazine flame retardants and any comments are given in Table 2b.

TABLE 1a

Flame-retardant mixture

Composition of flame-retardant mixture

| Example | Polymer type | Parts | parts of glass fibre | parts of triazine flame retardant | phosphorus compound type | parts | type of extruder | Composition of triazine flame retardant (wt. %) | | | | |
|---|---|---|---|---|---|---|---|---|---|---|---|---|
| | | | | | | | | M | Ma | Me | HC | VC |
| 1 | PBT | 45 | 30 | 15 | AB | 10 | ZSK30 | 6 | 1 | 73 | 20 | 0.3 |
| A | PBT | 45 | 30 | 15 | AB | 10 | ZSK30 | 0 | 100 | 0 | 0 | n.a. |
| B | PBT | 45 | 30 | 15 | AB | 10 | ZSK30 | 0 | 100 | 0 | 0 | n.a. |
| C | PBT | 45 | 30 | 0 | AB | 21.4 | ZSK30 | — | — | — | — | — |
| D | PBT | 45 | 30 | 15 | AB | 10 | Hb | 0.1 | 90 | 8.4 | 1.6 | 0 |
| 2 | PBT | 45 | 30 | 15 | AB | 10 | ZSK30 | 7 | 2 | 76 | 15 | 0.2 |
| 3 | PA6 | 45 | 20 | 30 | AB | 5 | ZSK30 | 0.5 | 0.5 | 91 | 8 | 0.1 |
| 4 | PBT | 45 | 30 | 15 | AB | 10 | ZSK30 | 0.5 | 0.5 | 91 | 8 | 0.1 |
| 5 | PBT | 45 | 30 | 15 | AB | 10 | ZSK30 | 1.3 | 0.1 | 64 | 34.6 | 0.1 |
| 6 | PBT | 45 | 30 | 15 | AB | 10 | ZSK30 | 1 | 0.1 | 86 | 12.9 | 0.2 |
| 7 | PBT | 45 | 30 | 15 | AB | 10 | ZSK30 | 0.6 | 0.1 | 18.2 | 81.1 | 0.1 |
| 8 | PBT | 45 | 30 | 19.5 | AB | 6 | ZSK30 | 2.5 | 0.4 | 79.1 | 18 | 0.2 |
| 9 | PBT | 45 | 30 | 23 | AB | 5 | ZSK30 | 2.5 | 0.4 | 79.1 | 18 | 0.2 |
| E | PBT | 42 | 30 | 23 | AB | 5 | Hb | 0 | 100 | 0 | 0 | 0 |
| 10 | PBT | 45 | 30 | 18 | AB | 8.8 | ZSK30 | 2.5 | 0.4 | 79.1 | 18 | 0.2 |
| 11 | PBT | 45 | 30 | 15 | NH-1 | 10 | hb | 2.5 | 0.4 | 79.1 | 18 | 0.2 |
| 12 | PBT | 45 | 30 | 15 | NH-2 | 10 | hb | 2.5 | 0.4 | 79.1 | 18 | 0.2 |
| 13 | PBT | 45 | 30 | 15 | AB | 10 | ZSK30 | 16.8 | 1.7 | 57.2 | 24.3 | 1.1 |
| 14 | PA66 | 50 | 25 | 20 | AB | 5 | Brabender | 2.5 | 0.4 | 79.1 | 18 | 0.2 |
| 15 | PA66 | 45 | 20 | 20 | MP | 15 | Brabender | 2.5 | 0.4 | 79.1 | 18 | 0.2 |
| 16 | PA66 | 45 | 20 | 25 | XPM1000 | 10 | Brabender | 2.5 | 0.4 | 79.1 | 18 | 0.2 |
| 17 | PA6 | 45 | 20 | 25 | AB | 10 | Brabender | 2.5 | 0.4 | 79.1 | 18 | 0.2 |
| 18** | PBT | 50 | 20 | 15 | AB | 3.5 | Brabender | 2.5 | 0.4 | 79.1 | 18 | 0.2 |
| 19 | PBT | 45 | 30 | 15 | AB | 10 | Hb | 0.8 | 0.1 | 93 | 6 | 0.1 |

TABLE 1b

Flame-retardant mixtures

Properties

| Example | UL94 classification a/b | Modulus of elasticity (GPa) | elongation at break (%) | average burning time after 1st ignition(s) a/b | average burning time after 2nd ignition(s) a/b |
|---|---|---|---|---|---|
| 1 | V0/V0 | 10.2 | 2.0 | 1/1 | 1/1 |
| A | V0/V0 | 10.0 | 2.0 | 3/1 | 3/3 |
| B | V0/V0 | 10.0 | 2.0 | 1/3 | 3/3 |
| C | NC | n.a. | n.a. | — | — |
| D | V0/n.a | n.a | n.a. | 1/n.a. | 4.4/n.a. |
| 2 | V0/V0 | 10.0 | 2.4 | 1/1 | 1/1 |
| 3 | V0/n.a. | 11.2 | 2.0 | 1/n.a. | 1/n.a. |
| 4 | V0/V0 | 10.2 | 2.1 | 1/1 | 1/1 |
| 5 | V0/V0 | 10.1 | 2.0 | 1/1 | 1/1 |
| 6 | V0/V0 | 10.0 | 2.0 | 1/1 | 1/1 |
| 7 | V0/V0 | 9.6 | 1.6 | 1/1 | 1/1 |
| 8 | V0/n.a. | n.a. | n.a. | 1/n.a. | 2/n.a. |
| 9 | V0/n.a. | n.a. | n.a. | 1/n.a. | 2/n.a. |
| E | V1/n.a | n.a | n.a. | 11/n.a. | 8/n.a. |
| 10 | V0/n.a. | n.a. | n.a. | 1/n.a. | 1/n.a. |
| 11 | V0/n.a.* | n.a. | n.a. | 1/n.a. | 1/n.a. |
| 12 | V0/n.a.* | n.a. | n.a. | 1/n.a. | 1/n.a. |
| 13 | V0/V0 | 11 | 2 | 1/1 | 1/1 |

TABLE 1b-continued

Flame-retardant mixtures

| Example | UL94 classification a/b | Modulus of elasticity (GPa) | elongation at break (%) | average burning time after 1st ignition(s) a/b | average burning time after 2nd ignition(s) a/b |
|---|---|---|---|---|---|
| 14 | V0/n.a. | n.a. | n.a. | 1/n.a. | 1/n.a. |
| 15 | V0/n.a. | n.a. | n.a. | 1/n.a. | 1/n.a. |
| 16 | V1/n.a. | n.a. | n.a. | 1/n.a. | 17/n.a. |
| 17 | V0/n.a. | n.a. | n.a. | 1/n.a. | 1/n.a. |
| 18 | V0/n.a. | n.a. | n.a. | 1/n.a. | 3/n.a. |
| 19 | V0/n.a. | n.a. | n.a. | 1/n.a. | 2/n.a. |

Legend of Table 1a and Table 1b
a: conditioned: 48 hours at 50% relative humidity and room temperature
AB: Antiblaze ® 1045
b: conditioned: 168 hours at 70° C.
hb: home-built mini-extruder with an internal volume of 5 ml
HC: higher condensation products of melamine and/or of melem
M: melamine
Ma: melam
Me: melem
MP: melamine pyrophosphate
NH-1: HN-1511 ® from Great Lakes
NH-2: NH-1197 ® from Great Lakes
n.a.: not assessed
NC: not classified
PA6: polyamide 6
PBT: polybutylene terephthalate
VC: volatile components
ZSK30: Werner & Pfleiderer ZSK 30/33 corotating
*2.0-mm-thick test bars used
**The flame-retardant mixture of example 18 contains 11.5 wt. % melamine sulphate as other flame retardant

TABLE 2a

Preparation of the triazine flame retardant

| Example | type of reactor | T (° C.) | residence time (s) | dosage | pressure (Mpa) | composition of starting material (wt. %) |
|---|---|---|---|---|---|---|
| F | ZSK30 | 330 | 115 | 3 kg/h | atm. | M |
| 20 | ZSK30 | 450 | 110 | 8 kg/h | atm. | M (98.7), U (1.0), CO$_2$ (0.06) Am (0.1), Oth. (0.12) cat. (0.02) |
| 21 | ZSK30 | 400 | 95 | 1 kg/h | atm. | M |
| 22 | see comment in Table 2b | | | | | product of Example 21 |
| 23 | ZSK30 | 450 | 80 | 3 kg/h | atm. | M |
| 24 | 2L autoclave | 500 | 3600 | 1.008 kg | 2 Mpa | M |
| 25 | ZSK30 | 450 | 110 | 8 kg/h | atm. | M (98), U (0.81), CO$_2$ (0.03) Am (0.05), Oth. (0.07) |
| 26 | 2L autoclave | 500 | 1800 | 1.008 kg | atm. | M |
| 27 | ZSK30 | 450 | n.a. | 3 kg/h | atm. | M (60), dcd (40) |
| 28 | ZSK30 | 450 | n.a. | 3 kg/h | atm. | M (50), Ma (50) |
| 29 | 2L autoclave | 450 | 1800 | 1.08 kg | atm. | M (9.26), (NH$_4$)$_2$NO$_3$ (7.4) |
| 30 | 2L autoclave | 450 | 3600 | 1.01 kg | atm. | M (99.01), NH$_4$H$_2$PO$_4$ (0.99) |
| 31 | 2L autoclave | 440 | 1800 | 1 kg | atm. | M (68), U (32) |
| 32 | 2L autoclave | 380 | 4200 | 1 kg | atm. | M (41.2), gc (58.8) |
| 33a | Be | <450 | n.a. | 2 kg/h | atm. | M |
| 33b | see comment in Table 2b | | | | | product of Example 33a |
| 34 | Le | 450 | 60 | 3 kg/h | atm. | M |

TABLE 2b

Preparation of the triazine flame retardant

| | Product's composition | | | | | |
|---|---|---|---|---|---|---|
| Example | M | Ma | Me | HC | VC | Comments |
| F | 88 | 6 | 2 | 4 | 1.6 | |
| 20 | 6 | 1 | 73 | 20 | 0.3 | starting material obtained in process according to US3210352, after quenching, before the crystallisation step |
| 21 | 8 | 0.5 | 73 | 18.5 | 0.4 | |
| 22 | 1 | 0.5 | 78.5 | 20 | <0.3 | the product of Example 21 was washed 3 times using hot water of 90° C. and filtered, after which it was dried |
| 23 | 1 | 0.1 | 86 | 12.9 | 0.2 | |
| 24 | 0.4 | 0.5 | 91 | 8 | 0.1 | pressure is autogenous, reactor was stirred |
| 25 | 7 | 2 | 77 | 14 | 0.2 | starting material obtained in process according to US4565867 |
| 26 | 11.4 | 0.1 | 65 | 23.5 | 0.2 | |
| 27 | 1.5 | 0.1 | 89.7 | 8.7 | 0.1 | |

TABLE 2b-continued

Preparation of the triazine flame retardant

| Example | Product's composition | | | | | Comments |
|---|---|---|---|---|---|---|
| | M | Ma | Me | HC | VC | |
| 28 | 2.3 | 7 | 63.8 | 26.9 | 0.1 | |
| 29 | 2 | 0.2 | 23.1 | 74.7 | 0.1 | |
| 30 | 8.3 | 0.2 | 69 | 22.5 | 0.1 | |
| 31 | 2.1 | 0.1 | 72.9 | 24.9 | 0.1 | |
| 32 | 1.1 | 0.2 | 84.3 | 14.4 | 0.1 | |
| 33a | 61.7 | 9.1 | 20.1 | 9.1 | n.a. | rise in temperature in extruder from 250° C. to 450° C. |
| 33b | 1.8 | 23.2 | 51.4 | 23.4 | <0.4 | the product of Example 33a was washed 3 times using hot water of 90° C. and filtered, after which it was dried |
| 34 | 0.5 | 0.1 | 91.8 | 7.6 | 0 | |

Legend of Table 2a and Table 2b
Am: ammeline, ammelide and cyanuric acid
atm.: atmospheric pressure
Be: Berstorff corotating double-screw Ø 25 mm
cat.: residual catalyst
dcd: dicyanodiamide
gc: guanidine carbonate
HC: higher condensation products of melamine and/or of melem
Le: Leistritz counter-rotating double-screw Ø 28 mm
M: melamine from DSM's gas-phase production process (unless otherwise specified under 'comments')
Ma: melam
Me: melem
n.a.: not assessed
Oth.: others, e.g. melem and melam
Q: dosage
T: reactor's set temperature
U: urea
VC: volatile components
ZSK30: Werner & Pfleiderer ZSK 30/33 corotating

What is claimed is:

1. Flame-retardant mixture comprising:

a) a polymer composition b) a phosphorus-containing compound c) a triazine flame retardant, the weight ratio of a, b and c lying between 94:1:5 and 35:30:35, characterised in that the triazine flame retardant comprises at least:

c1) 1–95 wt. % melem, c2) 0.01–25 wt. % melam, c3) 0.01–20 wt. % melamine, c4) 0.1–95 wt. % higher condensation products of melamine and/or of melem, the wt.% being relative to the total of c1) up to and including c4) and together amounting to 100%, and the concentration of volatile components in the flame retardant being at most 5 wt. %.

2. Flame-retardant mixture according to claim 1, wherein the polymer composition also comprises reinforcing agents and/or fillers.

3. Flame-retardant mixture according to claim 1, wherein the triazine flame retardant comprises at least:

c1) 10–95 wt. % melem, c2) 0.05–10 wt. % melam, c3) 0.1–20 wt. % melamine, c4) 1–90 wt. % higher condensation products of melamine and/or of melem, the wt.% being relative to the total of c1) up to and including c4) and together amounting to 100%, and the concentration of volatile components in the flame retardant being at most 5 wt. %.

4. Object made from the flame-retardant mixture according to claim 1.

5. Process for the preparation of a triazine flame retardant according to claim 1, wherein a triazine-containing starting material is heated for more than 0.1 sec. at a temperature of 350–800° C. and at a pressure of between 1 kPa and 50 MPa.

6. Process according to claim 5, wherein the triazine-containing starting material is heated in an autoclave or an extruder.

7. Process according to claim 6, wherein the triazine-containing starting material is heated in an extruder at a residence time in the extruder of between 0.1 sec and 60 minutes.

8. Process according to claim 5, wherein the triazine-containing starting material is a melamine-containing starting material.

9. Process according to claim 8, wherein the triazine flame retardant is subsequently washed with water to cause a portion of the melamine and any other water-soluble components to dissolve and be removed from the flame-retardant composition.

10. Flame-retardant triazine mixture according to claim 1, wherein the triazine flame retardant is prepared by heating a triazine-containing starting material for more than 0.1 sec. at a temperature of 350–800° C. and at a pressure of between 1 kPa and 50 MPa.

11. Flame retardant mixture according to claim 10, wherein the triazine-containing starting material is a melamine-containing starting material.

12. Flame retardant mixture according to claim 11, wherein the triazine flame retardant is subsequently washed with water to cause a portion of the melamine and any other water-soluble components to dissolve and to be removed from the flame-retardant composition.

* * * * *